(12) United States Patent
Leem et al.

(10) Patent No.: US 9,656,296 B2
(45) Date of Patent: May 23, 2017

(54) PREPARATION METHOD OF A SUPER ABSORBENT POLYMER

(75) Inventors: Gyu Leem, Daejeon (KR); Gi-Cheul Kim, Daejeon (KR); Sang-Gi Lee, Daejeon (KR); Kyu-Pal Kim, Daejeon (KR); Tae-Young Won, Daejeon (KR); Chang-Sun Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/370,151

(22) PCT Filed: Apr. 13, 2012

(86) PCT No.: PCT/KR2012/002817
§ 371 (c)(1),
(2), (4) Date: Jul. 1, 2014

(87) PCT Pub. No.: WO2013/154219
PCT Pub. Date: Oct. 17, 2013

(65) Prior Publication Data
US 2014/0329024 A1   Nov. 6, 2014

(30) Foreign Application Priority Data
Apr. 13, 2012 (KR) .................... 10-2012-0038478

(51) Int. Cl.
| | |
|---|---|
| *C08J 7/04* | (2006.01) |
| *B05D 3/06* | (2006.01) |
| *C08F 2/01* | (2006.01) |
| *C08F 2/10* | (2006.01) |
| *C08F 2/48* | (2006.01) |
| *B05D 1/02* | (2006.01) |

(Continued)

(52) U.S. Cl.
CPC .............. *B05D 3/067* (2013.01); *B01J 2/04* (2013.01); *B01J 2/26* (2013.01); *B05D 1/02* (2013.01);
(Continued)

(58) Field of Classification Search
CPC ........ B01J 2/02; B01J 2/26; B01J 2/04; C08F 2/01; C08F 2/48; C08F 2/10; C08F 6/008;
(Continued)

(56) References Cited

U.S. PATENT DOCUMENTS

| | | | |
|---|---|---|---|
| 5,380,808 A | 1/1995 | Sumiya et al. | |
| 2008/0045625 A1 | 2/2008 | Losch et al. | |

FOREIGN PATENT DOCUMENTS

| | | |
|---|---|---|
| CN | 1810297 A | 8/2006 |
| CN | 101573386 A | 11/2009 |

(Continued)

*Primary Examiner* — Robert S Walters, Jr.
(74) *Attorney, Agent, or Firm* — Dentons US LLP

(57) ABSTRACT

The present invention relates to a method of preparing a super absorbent polymer (SAP), and more specifically to a method of preparing a SAP including the steps of spraying the monomer composition on a substrate having a hydrophobic surface of a certain tan angle and carrying out a UV polymerization on a polymerization reactor having a slightly hydrophilic surface. The present invention can improve the conversion rate of polymerization because the shape of the monomer solution is changed from prior sheet form to droplet form so that UV rays reach the deeper layer of the droplets, can minimize or simplify the recycling process because it is easy to control the particles of the prepared polymer, and can provides the SAP of high caliber by narrowing the particle diameter distribution and improving the uniformity.

15 Claims, 2 Drawing Sheets

(51) Int. Cl.
    *C09D 133/08*     (2006.01)
    *C08F 6/00*     (2006.01)
    *B01J 2/04*     (2006.01)
    *B01J 2/26*     (2006.01)

(52) U.S. Cl.
    CPC .................. *C08F 2/01* (2013.01); *C08F 2/10* (2013.01); *C08F 2/48* (2013.01); *C08F 6/008* (2013.01); *C09D 133/08* (2013.01)

(58) Field of Classification Search
    CPC .............. C08F 220/06; C08F 2222/108; C08F 2222/1013; C08F 2/00; C08J 3/075; C08J 3/122; C08J 2300/14; B05D 3/067; B05D 1/02; C09D 133/08; C08L 101/14
    USPC ........................................................ 427/512
    See application file for complete search history.

(56) References Cited

FOREIGN PATENT DOCUMENTS

| | | |
|---|---|---|
| DE | 102004042955 A1 | 3/2006 |
| EP | 1440984 A1 | 7/2004 |
| EP | 1683813 A2 | 7/2006 |
| EP | 1813291 A1 | 8/2007 |
| JP | 56-161408 A | 12/1981 |
| JP | 57-158209 A | 9/1982 |
| JP | 57-198714 A | 12/1982 |
| JP | 2002-003509 A | 1/2002 |
| JP | 2002-265528 A | 9/2002 |
| JP | 2003-521349 A | 7/2003 |
| JP | 2004-250689 A | 9/2004 |
| JP | 2005-298681 A | 10/2005 |
| JP | 2006-016719 A | 1/2006 |
| JP | 2006-152095 A | 6/2006 |
| JP | 2006-160845 A | 6/2006 |
| JP | 2006-199862 A | 8/2006 |
| JP | 2010-513632 A | 4/2010 |
| KR | 10-1999-0057609 A | 7/1999 |
| KR | 10-0330127 B1 | 3/2002 |
| KR | 10-2005-0025337 A | 3/2005 |
| KR | 10-2009-0091824 A | 8/2009 |
| KR | 10-2012-0013152 A | 2/2012 |
| KR | 10-2011-0138636 A | 12/2012 |
| WO | 2005092956 A1 | 10/2005 |
| WO | 2009077526 A1 | 6/2009 |

PREPARATION METHOD OF A SUPER ABSORBENT POLYMER

This application is a 35 USC §371 National Stage entry of International Application No. PCT/KR2012/002817, filed on Apr. 13, 2012, which claims priority of Korean Application No. 10-2012-0038478, filed on Apr. 13, 2012, all of which are hereby incorporated by reference in their entirety.

TECHNICAL FIELD

The present invention relates to a method of preparing a super absorbent polymer, more specifically to a method of preparing a super absorbent polymer which can control the particle diameter and minimize the recycling process for the fine particles, and does not decrease the properties of the final product by narrowing the diameter distribution and increasing uniformity.

BACKGROUND OF THE INVENTION

Super absorbent polymer (SAP) is a synthetic polymer material having a function of absorbing water about 5 hundred times to about 1 thousand times of the weight of itself, and it has been differently named as super absorbency material (SAM), absorbent gel material (AGM), and so on by developing enterprises. The SAP disclosed above was started to be commercialized for sanitary items and is now being used widely to a water combination soil for horticulture, a water-stop material for civil engineering and construction, a nursery sheet, a freshness preservative in a food distribution field, a poultice material, and the like in addition to the sanitary fittings like a paper diaper for a child.

An inverse suspension polymerization method or an aqueous polymerization method is known as a method of preparing super absorbent polymer. For example, the inverse suspension polymerization is disclosed in Japanese Patent Publication Nos. Sho56-161408, Sho57-158209, Sho57-198714, and so on. As the aqueous polymerization method, a thermal polymerization method that polymerizes a polymer gel while fracturing and cooling the same in a kneader equipped with a spindle, and a photo-polymerization method that exposes a high-concentrated aqueous solution on a belt to UV rays and the like so as to carry out the polymerization and the dry at the same time are known.

Japanese Patent Publication No. 2004-250689 discloses a preparation method of an absorbent polymer that carries out the polymerization by intermittently irradiating the aqueous solution including a photoinitiator and a water-soluble ethylenic unsaturated monomer with light. And, Korean Patent No. 0330127 discloses a preparation method of an absorbent polymer that carries out the polymerization by irradiating a water-soluble ethylenic unsaturated monomer including a cross-linking agent with UV rays in the presence of a radical photoinitiator having a benzoyl group and peroxide.

As a prior method of using the UV polymerization, the method of feeding a monomer composition including a monomer and an initiator to a conveyor belt reactor 1; preparing a base resin 2, a hydrogel polymer in sheet form, by carrying out the reaction within several seconds by using UV rays; and preparing a powdery SAP by passing through several post-treatment processes has been used. Said post-treatment processes may include the processes of gel-sizing, sizing (cutting process), drying, pulverizing, surface treatment, and so on.

However, said method must include a recycling process repeating the processes of gel-sizing, drying, and sizing several times for obtaining the hydrogel polymer in fine particles. But there is a problem that the property of the SAP deteriorates because of the generation of fine particles and the additional process is required for the recycle, when the recycling process is carried out several times as disclosed above in order to control the diameter. Namely, there is a problem that the prior method may reduce the properties of the SAP and the overall process is inconvenient and complicated because the SAP having a unnecessary particle size distribution is formed in the processes of classifying-pulverizing and drying the gel polymer in order to prepare the SAP having a certain degree of particle size distribution adequate to a product.

Moreover, since the method is carried out by a 2-dimensional curing system after the monomer composition of the monomer and the initiator is fed in a liquid-phase, it has a problem of limitation on the thickness of the monomer composition according to the transmittance of light in the UV polymerization.

DETAILS OF THE INVENTION

Objects of the Invention

The present inventors completed the present invention in the process of repeatedly studying the method of preparing a super absorbent polymer (SAP) effectively without diminishing the properties of the final SAP.

It is an aspect of the present invention to provide a method of preparing the SAP which can improve the uniform polymerization property and the conversion rate of the monomer mixture having fine droplet size and makes control of the particle diameter easy, by spraying and contacting the monomer composition onto the substrate having a hydrophobic surface in the process of feeding the monomer composition including a monomer and an initiator to the polymerization reactor.

It is another aspect of the present invention to provide a method of preparing the SAP that not only makes the drying process for the particle diameter control minimal and effective and makes the pulverizing and classifying process minimal and simple but also provides the SAP having narrow particle diameter distribution and improved uniformity.

It is still another aspect of the present invention to provide a method of preparing the SAP without diminishing the properties of the obtained final SAP.

Means for Achieving the Objects

The present invention provides a method of preparing a super absorbent polymer (SAP), including the steps of:

preparing a monomer composition including a water-soluble ethylenic unsaturated monomer and a polymerization initiator;

preparing a monomer mixture of fine droplet having the sprayed droplet size of 300 μm or less by spraying said monomer composition on a substrate having a hydrophilic surface connected with a polymerization reactor;

preparing a fine hydrogel polymer by polymerizing said monomer mixture of fine droplet on a continuously moving polymerization reactor with UV rays; and drying said fine hydrogel polymer, wherein the substrate having the hydrophilic surface has the tan q value of 20° to 70° to the polymerization reactor.

Hereinafter, the method of preparing the SAP according to the specific embodiment of the invention is explained in more detail.

The present invention does not prepare the hydrogel polymer in a sheet form like existing methods but prepares the SAP in a fine particle form by more easy method, by specifically controlling the method of spraying the monomer composition including the monomer and the initiator and the surface condition of the surface to which the monomer composition contacts.

Particularly, because the present invention provides a moving route for the monomer mixture having fine droplet size before it reaches the polymerization reactor by not spraying and feeding the monomer composition directly to the polymerization reactor but spraying the same firstly onto the substrate having a strongly hydrophobic surface having a certain tan angle, the monomer mixture having fine droplet size can be aggregated on the hydrophobic surface in the form of various particles and can move by gravity force toward the polymerization reactor where it is irradiated with UV rays, and the UV polymerization is carried out. Since the shape of the monomer composition of the present invention is changed from solution into particles having fine droplet diameter, the UV rays can reach deeper layer inside the particle within the penetration depth range of light and it is possible to increase the polymerization conversion rate largely and to decrease the content of residual monomer, in comparison with existing sheet-type polymerization methods.

And, the present invention may provide the preparation method of the fine SAP particle that is easy to control the particle size and provides the fine particles having uniform size and narrow particle diameter distribution by adequately controlling the spray condition of the monomer composition.

Therefore, according to the present invention, the present invention does not need a separate cutting process and can minimize the generation of fine powder due to a plurality step of pulverization processes because there is no need to form existing sheet-type hydrogel polymer. Therefore, the present invention can obtain the fine particles having a desired size and a uniform particle size distribution through an easy process and can prepare the SAP economically because of the easy drying process. And, the present invention has no fear of decreasing the properties of the finally prepared SAP or a skin stimulation that may be caused when the SAP is used in the form of final product.

The preparation method of the SAP of the present invention is explained as follows by referring to the annexed Figs.

FIG. 2 is a schematic diagram briefly showing the processes of the preparation method of the SAP according to preferable one embodiment of the present invention.

According to one embodiment of the present invention, a method of preparing the super absorbent polymer (SAP), including the steps of: preparing a monomer composition including a water-soluble ethylenic unsaturated monomer and a polymerization initiator; preparing a monomer mixture of fine droplet having the sprayed droplet size of 300 µm or less by spraying said monomer composition on a substrate having a hydrophilic surface connected with a polymerization reactor; preparing a fine hydrogel polymer by polymerizing said monomer mixture of fine droplet on a continuously moving polymerization reactor with UV rays; and drying said fine hydrogel polymer is provided.

Referring to said embodiment and FIG. 2, the method of the present invention is characterized in using the slightly hydrophilic polymerization reactor equipped with a spraying device for spraying the monomer composition, and the hydrophobic substrate.

More specifically, the SAP according to one embodiment of the present invention may be prepared by a device comprising a spraying device 20 for spraying the monomer composition 30 including the monomer and the polymerization initiator, a substrate 40 having a hydrophobic surface on which the monomer composition sprayed through the spraying device is aggregated and the monomer mixture of fine droplet is formed; a polymerization reactor 10 having a slightly hydrophilic surface 50 on which the monomer mixture of fine droplet is polymerized, and a UV irradiation device 60 for irradiating the monomer mixture of fine droplet with UV rays.

Namely, the monomer composition 30 including the monomer and the polymerization initiator is fed to the spraying device 20 and sprayed on the substrate 40 that is connected to the polymerization reactor and has a hydrophilic surface in the preparation method of the SAP of the present invention. The sprayed monomer composition 30 droplets are hydrophilic and they are aggregated on the hydrophobic substrate in various spherical particle forms like water drops and form the monomer mixture 32 of fine droplet through the process. A plurality of the fine droplets aggregated like above flows down (a direction in FIG. 2) to the slightly hydrophilic polymerization reactor by gravity force while maintaining the droplet shape, and moves to the polymerization reactor 10 for the UV ray radiation. And then, the fine droplet particles moved to the polymerization reactor 10 are irradiated with UV rays by using a UV radiation device 60 so as to polymerize the monomer mixture of fine droplet, and the fine hydrogel polymer 34 is prepared.

As disclosed above, the present invention can prepare the SAP having a desired and uniform size and very superior properties by using the substrate having the hydrophobic surface and the slightly hydrophilic polymerization reactor and controlling the spray method adequately. Furthermore, since the present invention carries out the polymerization after making the monomer mixture into the fine droplet particles of uniform size, the UV rays can reach deeper layer of the particles and the polymerization may be carried out more smoothly.

Here, the device comprising the substrate having the hydrophobic surface and the slightly hydrophilic polymerization reactor is explained in more detail. FIG. 3 is a mimetic diagram briefly showing the components of the polymerization device used in the preparation method of the SAP of the present invention.

Referring to FIG. 3, the device for preparing the SAP of the present invention has highly hydrophobic surface zone I and slightly hydrophilic zone II.

At this time, zone I includes the substrate 40 having the hydrophobic surface, and is characterized in that it is not parallel to the polymerization reactor 10 and has a certain inclined angle ($\theta_1$) to the polymerization reactor. At this time, it is preferable that the substrate having the hydrophobic surface has the tan q value ($\theta_1$) of 20° to 70° the polymerization reactor. When the angle is below 20°, there is a problem that it is hard for the monomer composition to flow down to the polymerization reactor and irregular particles are formed due to excessive aggregation between the particles because the particle formation speed of the sprayed monomer composition slows. And, when the angle is over 70°, there is a problem that the sprayed monomer composition flows down to the polymerization reactor immediately and irregular polymer is obtained after the UV polymerization because the substrate is almost perpendicular.

The preparation method of the substrate having the hydrophobic surface is not limited particularly. For example, a substrate having a Teflon coated surface and a silicone coated substrate may be used, and preferably the silicone coated substrate may be used. Namely, the present invention can provide the characteristics unique to the silicone to the substrate material by making the silicone of low surface tension into a paint form and applying the same to the substrate material through the processes of spray or powdery electrostatic painting, drying, heating, and sintering. The surface of the substrate can show not only unique releasing property but also chemical resistance, heat resistance, insulation stability, and low friction coefficient because of the silicone coating. The present invention provides hydrophobicity to the surface of the substrate through said silicone coating process so that the sprayed monomer composition forms droplets on the surface and flows down well. Furthermore, a general fluorination substitution coating may be applied to the present invention instead of said silicone coating.

Glass, rubber, ceramic, plastic (PE, PES, PEN, and so on), and so on may be used as the substrate material, but the kinds of materials are not limited particularly. And a silicone substrate made of hydrophobic material or a sapphire substrate may be used as the substrate.

In the present invention, the polymerization reactor is located at zone II and connected to the end of the substrate having the hydrophobic surface. The polymerization reactor 10 is characterized in having the slightly hydrophilic surface 50. Preferably, the polymerization reactor may have the slightly hydrophilic property and the contact angle to water of the surface or the whole of the same is 30° to 90°. Since the polymerization reactor has the slightly hydrophilic property, it is possible to prevent the mobility of the particles from growing too larger. And a continuously moving conveyor belt may be used as the polymerization reactor because it is possible to provide slightly hydrophilic property to the material for preparing common SAP according to said silicone coating method. Said conveyor belt may be a rotating belt to which slight hydrophilicity is provided by coating a silicone on a rubber or a fabric.

Meanwhile, it is preferable that said spraying device 20 is equipped with a hydraulic nozzle even though it is not illustrated minutely in the drawings. The slot number of the nozzle may be 1 to 9 and the core size may be 0.2 mm to 0.9 mm.

At this time, the present invention is characterized in controlling the droplet size and speed according to the spray of monomer composition by controlling the nozzle pressure of the spraying device.

FIGS. 4 and 5 are mimetic diagrams briefly showing the spraying method of the monomer composition in the preparation method of the SAP of the present invention.

Firstly, the present invention may control the spray pattern when spraying the monomer composition from the spraying device 20 and, as shown in FIG. 4, it may be a full cone pattern (a' of FIG. 4) of which the spray efficiency is very high. At this time, said spraying device may include a full cone type spray nozzle.

And, the present invention can realize the fine atomization by spraying the monomer composition so that the spray droplet size is 10 to 150 µm in the spray pattern using the spraying device. Namely, the present invention can realize the ultra-fine atomization by carrying out the process of spraying the monomer composition so that the spray droplet size of the spray pattern is 10 µm or more.

Therefore, the present invention can form the monomer mixture of fine droplet having the spray droplet size of 300 µm or less, preferably 15 to 200 µm, and more preferably 20 to 200 µm, on the substrate by controlling the spray pattern of the spraying process adequately like above. For example, such monomer mixture of fine droplet may be formed by that one or more sprayed droplets of the monomer composition of 10 to 150 µm are aggregated or separated on the substrate.

The effectiveness according to the present invention can be shown by specifying the spray angle when the monomer composition is sprayed. Referring to FIG. 5, if the spray angle of the monomer composition sprayed from the spraying device 20 is defined as "$\theta_2$", it is preferable that the monomer composition is sprayed on the substrate having the hydrophobic surface with the spraying angle of 20° to 150° from the hydraulic nozzle of the spraying device. When the spray angle is below 20°, there is a problem that the monomer composition is sprayed intensively on narrow area, and when it is over 150°, there is a problem that it is widely sprayed and gets out the hydrophobic surface.

The monomer composition is preferably sprayed on the substrate having the hydrophobic surface with the spraying speed of 0.5 to 5 ms$^{-1}$. When the spraying speed is below 0.5 ms$^{-1}$, there is a problem of decreasing the productivity due to low spray pressure, and when it is over 5 ms$^{-1}$, there is a problem that the monomer composition is not uniformly distributed on the hydrophobic surface because of the spray pressure. Therefore, the spraying device of the present invention may be equipped with a separate speed control means, and a temperature control means as occasion demands.

The conditions of the UV polymerization of the monomer composition are not limited particularly, and common methods for preparing the SAP may be used. For example, the UV polymerization (photo-polymerization) may be carried out in a wide temperature range of 25 to 99° C. by irradiating the same with UV rays for 10 secs to 5 mins because the temperature does not largely influence on the UV polymerization. Furthermore, the intensity of the UV radiation may be 0.1 to 30 mW/cm$^2$. The light source and the wavelength range well known to the related art can be used in the UV radiation.

And, though it is not illustrated in drawing, the monomer composition may be prepared by mixing the monomer and the polymerization initiator in a mixer equipped with a raw material feeder and a solvent feeder. And then, the monomer composition may be fed into a separate spraying device, or may be fed into the spraying device through a transfer line connected to the mixer.

One embodiment of the present invention goes through the step of drying the obtained hydrogel polymer, and may further include an additional pulverizing process and a surface treatment process as occasion demands, so as to prepare the SAP of uniform and fine particles. Namely, according to the present invention, the fine SAP particles can be obtained by the very drying process and the ultra-fine particles can be obtained by an additional pulverization process as needed because the monomer mixture is polymerized in the form of fine droplets. Particularly, the present invention does not need the cutting process of the sheet form polymer as before, and can minimize or simplify the multi-step cutting process for atomizing the particles.

The temperature and the time for drying the polymer may be adequately selected according to the moisture content of the prepared hydrogel polymer, and it may be preferable to carry out the drying process at the temperature of 160 to 175° C. for 20 to 40 mins. When the drying temperature is below 160° C., the drying effect is marginal, the drying time grows excessively longer, and it is difficult to make the moisture content be 30 weight % or less. And, when the drying temperature is higher than 175° C., only the surface of the hydrogel polymer is locally and excessively dried and the property of product deteriorates, and the absorptivity under pressure tends to decrease because plenty of fine powders is formed in the succeeding pulverizing step.

The detailed device for drying are not limited particularly, and for example, the drying step may be carried out by infrared ray radiation, hot air, microwave radiation, or UV ray radiation. And, the drying temperature and the time may be adequately selected according to the moisture content of the polymer prepared by the UV polymerization, and it may be preferable to carry out the drying process at the temperature of 80 to 200° C. for 20 to 120 mins. When the drying temperature is below 80° C., there is a problem that the drying effect is marginal and the drying time grows excessively longer, and when the drying temperature is higher than 200° C., there is a problem that the SAP is thermal-degraded.

When the dried polymer is additionally pulverized, any method used for pulverizing the polymer can be selected without limitation. Preferably, any pulverizing machine selected from the group consisting of a pin mill, a hammer mill, a screw mill, a roll mill, and the like may be used in the pulverizing process. At this time, it is preferable that the average diameter of the final SAP particles is 150 to 850 µm after the pulverizing process.

In the present invention, the polymer that has passed through the drying step and the additional pulverizing step as is necessary may be prepared into the SAP of uniform and fine particles by carrying out the surface treatment process.

At this time, the moisture content after drying of the hydrogel polymer obtained by the UV polymerization may be 1 to 10 weight %. At this time, the moisture content of the hydrogel polymer is the content of moisture in the whole weight of the hydrogel polymer, and it means the value that the weight of the dried polymer is subtracted from the weight of the hydrogel polymer.

Meanwhile, details of each monomer for the monomer composition are explained.

It is preferable that the polymerization of the water-soluble ethylenic unsaturated monomer is carried out in an aqueous solution in the present invention.

The water-soluble ethylenic unsaturated monomer is not limited if it is a usual monomer for preparing the SAP. For example, one or more monomers selected from the group consisting of an anionic monomer and a salt thereof, a nonionic hydrophilic monomer, and an amino-containing unsaturated monomer and a quaternary compound thereof may be used.

Specifically, the water-soluble ethylenic unsaturated monomer may preferably be one or more compounds selected from the group consisting of anionic monomers such as acrylic acid, methacrylic acid, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, and 2-(meth)acrylamide-2-methyl propane sulfonic acid, and salts thereof; nonionic hydrophilic monomers such as (meth)acrylamide, N-substituted (meth)acrylate, 2-hydroxyethyl(meth)acrylate, 2-hydroxypropyl(meth)acrylate, methoxy polyethylene glycol (meth)acrylate, and polyethylene glycol (meth)acrylate; and amino-containing unsaturated monomers such as (N,N)-dimethylaminoethyl (meth)acrylate and (N,N)-dimethylaminopropyl (meth)acrylamide, and a quaternary compound thereof. More preferably, the water-soluble ethylenic unsaturated monomer may be acrylic acid and a salt thereof because they have advantage in the excellent properties.

The concentration of the water-soluble ethylenic unsaturated monomer in the monomer composition may be adequately selected by considering the polymerization time and the reaction conditions, and it may be 35 to 50 weight % preferably. When the concentration of the water-soluble ethylenic unsaturated monomer is below 35 weight %, there are problems of low yield rate and low economic feasibility, and when it is over 50 weight %, it is disadvantageous because the monomer solubility decreases.

The polymerization initiator may be acetophenone, benzoin, benzophenone, benzyl, or a derivative thereof, and it may be one or more photo initiators selected from the group consisting of acetophenone derivatives such as diethoxy acetophenone, 2-hydroxy-2-methyl-1-phenylpropane-1-on, benzyl dimethyl tar, 4-(2-hydroxy ethoxy)phenyl-(2-hydroxy)-2-propyl ketone, 1-hydroxycyclohexylphenyl ketone, and so on; benzoin alkyl ethers such as benzoin methyl ether, benzoin ethyl ether, benzoin isopropyl ether, benzoin isobutyl ether; benzophenone derivatives such as methyl o-benzoylbenzoate, 4-phenyl benzophenone, 4-benzoyl-4'-methyl-diphenyl sulfide, (4-benzoyl benzyl)trimethyl ammonium chloride, and so on; thioxanthone-based compounds; acyl phosphine oxide derivatives such as bis(2,4,6-trimethylbenzoyl)-phenyl phosphine oxide, diphenyl(2,4,6-trimethylbenzoyl)-phosphine oxide, and so on; and azo-based compounds such as 2-hydroxy methyl propionitrile, 2,2'-{azobis(2-methyl-N-(1,1'-bis(hydroxymethyl)-2-hydroxyethyl)propionamide)}.

The polymerization initiator may be used in the amount of 0.01 to 1.0 weight % per the whole monomer composition.

The monomer composition according to the present invention may further include a cross-linking agent.

The cross-linking agent may be one or more compounds selected from the group consisting of cross-linking agents having the water-soluble substituent of the ethylenic unsaturated monomer, at least one functional group which can react with the water-soluble substituent of the ethylenic unsaturated monomer, and at least one ethylenic unsaturated group, and a mixture of them; cross-linking agents having the water-soluble substituent of the ethylenic unsaturated monomer and at least two functional groups which can react with the water-soluble substituent formed by the hydrolysis of a vinyl monomer, and a mixture of them. The cross-linking agent having two or more ethylenic unsaturated groups may be a $C_8$-$C_{12}$ bis acrylamide or bis methacrylamide, a poly (meth)acrylate of $C_2$-$C_{10}$ polyol, a poly(metha)allylether of $C_2$-$C_{10}$ polyol, and the like, and one or more agents selected from the group consisting of N,N'-methylenebis(meth)acrylate, ethyleneoxy(meth)acrylate, polyethyleneoxy(meth)acrylate, propyleneoxy(meth)acrylate, glycerine diacrylate, glycerine triacrylate, trimethylolpropane triacrylate, triallyl amine, triaryl cyanurate, triallyl isocyanate, polyethylene glycol, diethylene glycol, and propylene glycol may be used.

The cross-linking agent may be used in the amount of 0.01 to 1.0 weight % per the whole monomer composition.

Effects of the Invention

In comparison with a prior common method carried out in a kneader polymerization device, the present invention can control the particle size of the SAP and minimize the recycling process for the SAP having a unnecessary particle distribution by specifying the spray condition of the monomer composition and the surface condition of the polymerization reactor and using the substrate having hydrophobic surface. Furthermore, since the shape of the monomer solution is changed from prior sheet form to droplet form in the present invention so that UV rays reach the deeper layer of the droplets, there are many effects that the conversion rate of polymerization increases, the residual monomer decreases, the particle size distribution becomes narrow, the uniformity increases, the drying process becomes easy, the additional cutting and pulverizing processes after drying can be simplified, and the fine powder generation shown in general processes can be effectively controlled. Furthermore, it is possible to eliminate the moisture after polymerization effectively from the SAP of the present invention, and the present method does not diminish the properties of the final SAP and can improve the efficiency of the whole process because it needs only a minimum additional drying process.

Therefore, the present invention can contribute the SAP-related industry field through said preparation method of the SAP because the method can prepare the SAP having excellent properties more effectively.

DETAILED DESCRIPTION OF THE EMBODIMENT

Hereinafter, the action and the effect of the present invention are explained in more detail through specific Examples of the invention. However, the following examples are only for illustrating the present invention, and the scope of a right of the invention is not limited to or by them.

Example 1

Figure 2:
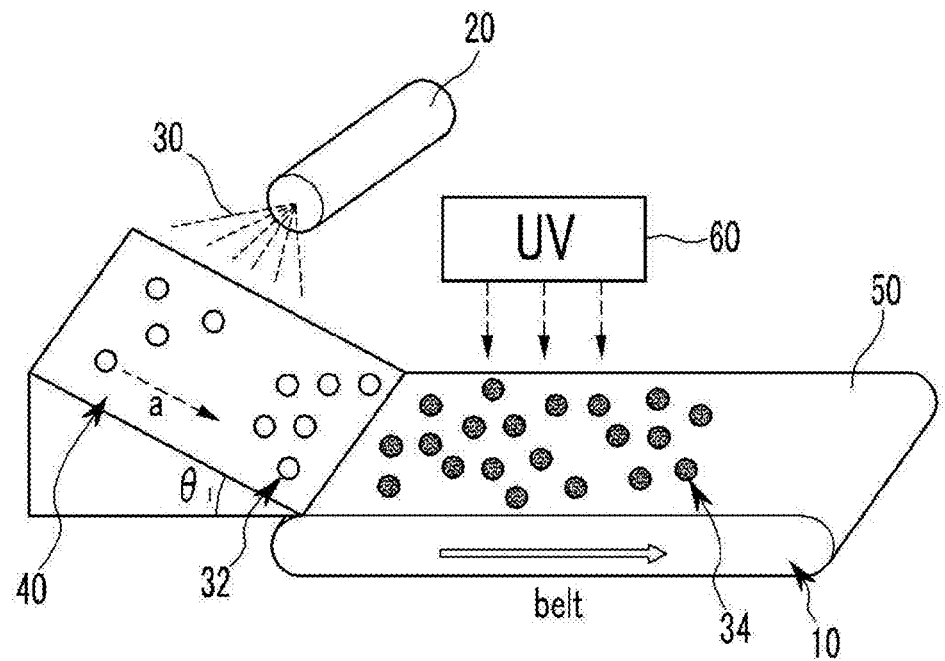
FIG. 2 is a schematic diagram briefly showing the processes of the preparation method of the SAP according to preferable one embodiment of the present invention.
Figure 3:
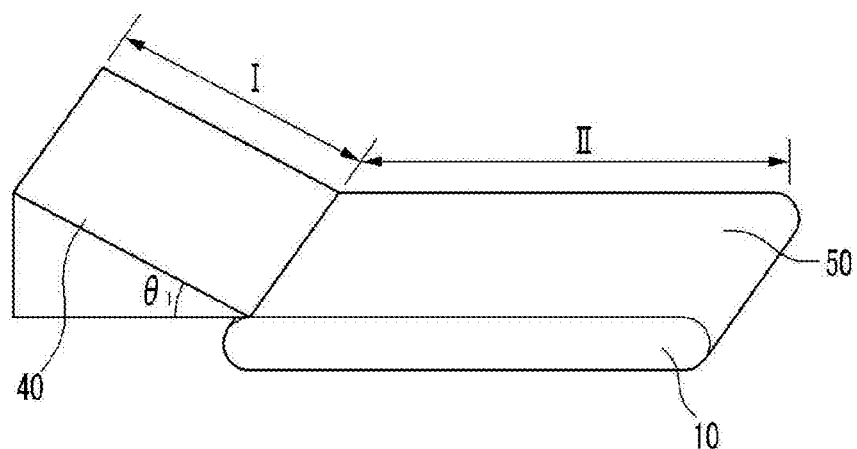
FIG. 3 is a mimetic diagram briefly showing the components of the polymerization device used in the preparation method of the SAP of the present invention.
Figure 4:
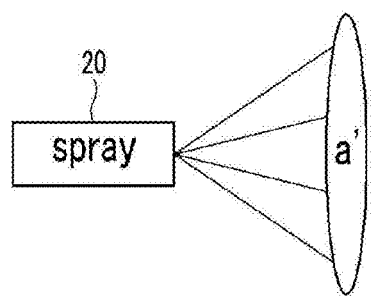
FIGS. 4 and 5 are mimetic diagrams briefly showing the preferable spraying method of the monomer composition in the preparation method of the SAP of the present invention.
Figure 5:
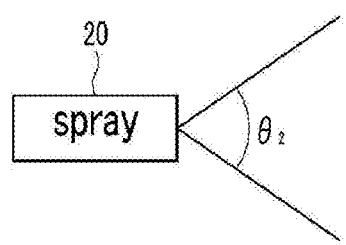

The SAP was prepared according to the method illustrated in FIG. 2.

The aqueous monomer solution composition was prepared by mixing 100 g of acrylic acid, 0.5 g of polyethyleneglycol diacrylate (Mw=523) as a cross-linking agent, 0.033 g of diphenyl(2,4,6-trimethylbenzoyl)-phosphine oxide as a UV initiator, 83.3 g of 50% sodium hydroxide (NaOH), and 89.8 g of water. The monomer concentration in the composition was 45 weight %.

And then, the aqueous monomer solution composition was fed to the spraying device through the monomer feeder and sprayed on the surface of the silicone-coated material (the substrate having the hydrophobic surface) with the spraying speed of 1.0 ms$^{-1}$ and the spraying angle of 45° through the hydraulic nozzle of the spraying device so as to form the monomer mixture having fine droplet size. And then, when the monomer mixture having fine droplet size moved onto the continuously moving conveyor belt of silicone material having slight hydrophilicity of 10%, and the mixture were irradiated with UV rays (intensity: 2 mW/cm$^2$) for 2 mins by using the UV radiation device and the fine hydrogel polymer was prepared by the UV polymerization.

At this time, the substrate having the hydrophobic surface was prepared to have the tan q value of 30° the polymerization reactor. And, the monomer composition was sprayed to have the spray droplet size of 100 μm.

The fine hydrogel polymer was dried in a hot air dryer of 160° C. for 30 mins. Successively, the polymer was pulverized by using a pin mill pulverizer and the SAP having the average particle size of 150 to 300 μm was obtained by using a sieve.

And then, after the surface of the SAP was cross-linked by using a solution of ethyleneglycol diglycidyl ether, water, and ethanol, the surface-treated SAP having the average particular diameter of 150 to 300 μm was obtained by reacting at 120° C. for 30 mins, pulverizing, and classifying the same with a sieve.

Example 2

The SAP was prepared substantially according to the same method as in Example 1, except that the substrate having the hydrophobic surface had the tan q value of 60° to the polymerization reactor.

Example 3

The SAP was prepared substantially according to the same method as in Example 1, except that the spraying speed was changed to 2.0 ms$^{-1}$.

Example 4

The SAP was prepared substantially according to the same method as in Example 1, except that the spraying angle was changed to 60°.

Comparative Example 1

Figure 1:
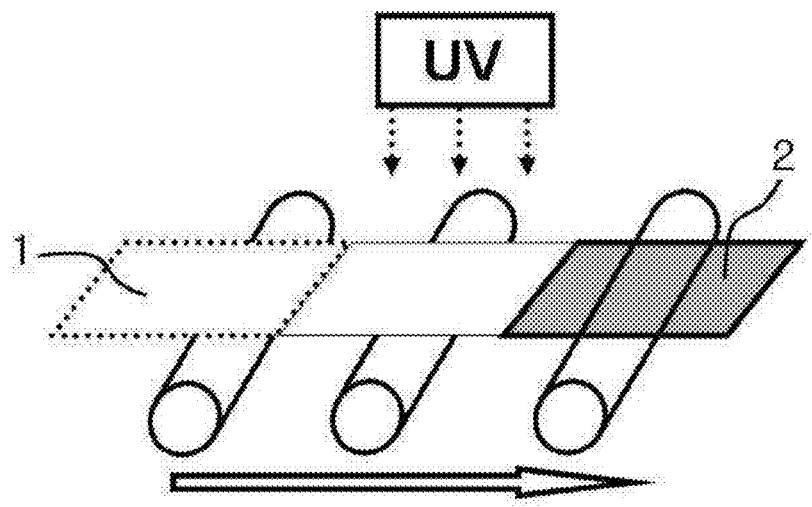
FIG. 1 is a schematic diagram briefly showing the processes of the preparation method of the SAP according to an existing UV polymerization.

The sheet form hydrogel polymer 2 (base resin) was prepared by feeding the monomer composition to the continuously moving conveyor belt reactor 1 (the reactor lacking in the substrate having the hydrophobic surface) of FIG. 1 and irradiating the same with UV rays in the same condition as in Example 1.

The SAP was prepared substantially according to the same method as in Example 1, except that the spraying speed was changed to 8.0 ms$^{-1}$.

The SAP was prepared by carrying out the post-treatment processes of gel-sizing, sizing (cutting process), drying, pulverizing, and surface treatment to the hydrogel polymer.

Comparative Example 2

The SAP was prepared substantially according to the same method as in Example 1, except that the substrate having the hydrophobic surface had the tan q value of 80° to the polymerization reactor.

Comparative Example 3

The SAP was prepared substantially according to the same method as in Example 1, except that the substrate having the hydrophobic surface had the tan q value of 1010 the polymerization reactor.

Experimental Examples

Evaluation on the Moisture Content and the Properties of the SAP

Experimental Example 1

Evaluation on the Moisture Content

After feeding 1 g of each absorbent polymer powder according to Examples and Comparative Examples into a dryer using an infrared (IR) ray and drying the same at 180° C. for 40 mins, the moisture content was measured. The results are listed in Table 1.

TABLE 1

|  | Example 1 | Example 2 | Example 3 | Example 4 | Comparative Example 1 | Comparative Example 2 | Comparative Example 3 |
|---|---|---|---|---|---|---|---|
| Moisture content (%) | 1.80 | 1.40 | 2.03 | 1.62 | 2.14 | 2.4 | 2.29 |

As shown in Table 1, the SAPs of the present invention of Examples 1 to 4 show lower moisture content than the polymers of Comparative Examples 1 to 3, and it is recognizable that the moisture after polymerization can be effectively eliminated. Therefore, the present invention can realize the simplification of the whole process and improve the process efficiency because it needs only a minimum additional drying process without a kneading process for frittering the polymer.

Experimental Example 2

Evaluation on the Properties

The following tests were carried out in order to evaluate the properties of the SAPs of Examples and the polymers of Comparative Examples. And, the properties of the absorbent polymers of Examples and Comparative Examples were measured by the following methods and the results are listed in Table 2.

(1) Absorption Ratio (CRC) Under Non Loading Condition

After inserting W (g) (about 0.1 g) of each polymer obtained in Examples and Comparative Examples uniformly in a nonwoven bag and sealing the same, it was soaked in a 0.9 weight % saline solution at the room temperature. After 30 mins, the bag was dehydrated for 3 mins by using a centrifugal separator with 250 G and the weight W2 (g) of the dehydrated bag was measured. And, after carrying out the same processes as above except not using the polymer, the weight W1 (g) was measured. CRC (g/g) was calculated according to the following equation by using the weight obtained above.

$$CRC(g/g) = \{(W2(g) - W1(g))/W(g)\} - 1 \quad \text{[Mathematical Equation 1]}$$

(2) Water-Soluble Component (Extractable Content)

The water-soluble component was measured according to the same order and method as disclosed in WO 2005/092956. However, it was different that 190 g of saline solution was used.

(3) Absorbency Under Pressure (AUP)

A 400 mesh stainless steel net was installed in the bottom of the plastic cylinder having the internal diameter of 60 mm. 0.90 g of the SAP was uniformly scattered on the steel net at the room temperature and the humidity of 50%, and a piston which can provide the load of 4.83 kPa (0.7 psi) uniformly was put on the same. At this time, the external diameter of the piston was slightly smaller than 60 mm, there was no gab between the internal wall of the cylinder and the piston, and the jig-jog of the cylinder was not interrupted. The weight Wa (g) of the device was measured.

After putting a glass filter having the diameter of 90 mm and the thickness of 5 mm in a petri dish having the diameter of 150 mm, a saline solution of 0.90 weight % of sodium chloride was poured in the dish until the surface level became equal to the upper surface of the glass filter. A sheet of filter paper having the diameter of 90 mm was put on the same. Said measuring device was put on the filter paper and the solution was absorbed for 1 hr under the load. After 1 hr, the weight Wb (g) was measured after lifting the measuring device up.

The absorbency under pressure (AUP) was measured from Wa and Wb according to the following equation.

$$AUP\ (g/g) = [Wb(g) - Wa(g)]/\text{weight of the absorbent polymer (g)} \quad \text{[Mathematical Equation 2]}$$

TABLE 2

|  | Absorption ratio (CRC) under non loading condition (g/g) | Water-soluble component (%) | Absorbency under pressure (g/g) |
|---|---|---|---|
| Example 1 | 32.5 | 13.1 | 20.7 |
| Example 2 | 29.8 | 14.2 | 21.5 |
| Example 3 | 31.7 | 12.9 | 21.2 |
| Example 4 | 35.1 | 13.5 | 22.0 |
| Comparative Example 1 | 30.0 | 15.2 | 19.2 |
| Comparative Example 2 | 33.5 | 16.3 | 18.6 |
| Comparative Example 3 | 28.7 | 15.7 | 20.9 |

As shown in Table 2, it is recognizable that the SAPs of Examples 1 to 4 show the properties beyond the equivalent level in comparison with Comparative Examples 1 to 3 and more effective and excellent absorbency

EXPLANATIONS FOR DRAWING NUMBERS

1: Conveyor belt reactor
2: Base resin (hydrogel polymer of sheet form)
10: Polymerization reactor
20: Spraying device 30: Monomer composition being sprayed
32: Monomer mixture having fine droplet size
34: Fine hydrogel polymer
40: Substrate having a hydrophobic surface
50: Slightly hydrophilic surface
60: UV radiation device

The invention claimed is:

1. A method of preparing a super absorbent polymer (SAP), including the steps of:
   preparing a monomer composition including a water-soluble ethylenic unsaturated monomer and a polymerization initiator;
   preparing a monomer mixture of fine droplets having a sprayed droplet size of 300 μm or less by spraying said monomer composition onto a substrate having a hydrophobic surface, such that said fine droplets flow down from the hydrophobic surface of the substrate to an adjacent polymerization reactor;
   preparing a fine hydrogel polymer by polymerizing said monomer mixture of fine droplets on the polymerization reactor by receiving said fine droplets from the hydrophobic surface of the substrate to a moving surface of the polymerization reactor, and irradiating said fine droplets with UV rays; and
   drying said fine hydrogel polymer,
   wherein the substrate having the hydrophobic surface is positioned such that a plane parallel to the hydrophobic surface of the substrate is inclined at an angle $\theta_1$ having a value of 20° to 70° with respect to a plane including the moving surface of the polymerization reactor.

2. The method according to claim 1, wherein the substrate having the hydrophobic surface is a substrate having a surface coated with polytetrafluoroethylene or a substrate coated with silicone.

3. The method according to claim 1, wherein the moving surface of the polymerization reactor has a slightly hydrophilic surface and the contact angle to water of the slightly hydrophilic surface is 30° to less than 90°.

4. The method according to claim 1, wherein the monomer composition is sprayed on the substrate having the hydrophobic surface with a spraying speed of 0.5 to 5 ms$^{-1}$.

5. The method according to claim 1, wherein the monomer composition is sprayed so that the sprayed droplet size is 10 μm or more.

6. The method according to claim 1, wherein the monomer composition is sprayed so that the sprayed droplet size is 10 to 150 μm.

7. The method according to claim 1, wherein the monomer composition is sprayed so that the sprayed droplet size is 20 to 200 μm.

8. The method according to claim 1, wherein the UV polymerization is carried out at a temperature of 25 to 99° C. for 10 secs to 5 mins by irradiating with UV rays.

9. The method according to claim 1, wherein the monomer composition further includes a cross-linking agent.

10. The method according to claim 1, wherein the water-soluble ethylenic unsaturated monomer is one or more compounds selected from the group consisting of:
    anionic monomers of acrylic acid, methacrylic acid, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, and 2-(meth)acrylamide-2-methyl propane sulfonic acid, and salts thereof;
    nonionic hydrophilic monomers of (meth)acrylamide, N-substituted (meth)acrylate, 2-hydroxyethyl(meth)acrylate, 2-hydroxypropyl(meth)acrylate, methoxy polyethylene glycol(meth)acrylate, and polyethylene glycol (meth)acrylate; and
    amino-containing unsaturated monomers of (N,N)-dimethylaminoethyl (meth)acrylate and (N,N)-dimethylaminopropyl (meth)acrylamide.

11. The method according to claim 1, wherein a concentration of the water-soluble ethylenic unsaturated monomer is 20 to 60 weight %.

12. The method according to claim 1, wherein the polymerization initiator is any one compound selected from the group consisting of an azo-based initiator, a peroxide-based initiator, a redox-based initiator, an organic halide initiator, acetophenone, benzoin, benzophenone, and benzyl.

13. The method according to claim 1, further including a step of pulverizing the dried polymer by using any one pulverizing machine selected from the group consisting of a pin mill, a hammer mill, a screw mill, and a roll mill.

14. The method according to claim 1, forming a powdery resin having a particle diameter of 150 to 850 μm.

15. The method according to claim 1, wherein a moisture content of the dried polymer is 1 to 10 weight %.

* * * * *